(12) United States Patent
Won et al.

(10) Patent No.: US 11,161,438 B2
(45) Date of Patent: Nov. 2, 2021

(54) VENTILATION DEVICE FOR SLIM VEHICULAR SEAT

(71) Applicants: Hyundai Motor Company, Seoul (KR); Kia Motors Corporation, Seoul (KR)

(72) Inventors: Tae Hee Won, Hwaseong-Si (KR); Gil Ju Kim, Seoul (KR); Jung Sang You, Hwaseong-Si (KR); Chan Ho Jung, Gunpo-Si (KR); Ju Yeol Kong, Ansan-Si (KR); Seon Chae Na, Yongin-Si (KR); Kwang Bin Im, Anyang-Si (KR); Hyuk Kim, Ansan-Si (KR); Seung Gyu Hong, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/932,577

(22) Filed: Jul. 17, 2020

(65) Prior Publication Data

US 2021/0276464 A1 Sep. 9, 2021

(30) Foreign Application Priority Data

Mar. 4, 2020 (KR) .......................... 10-2020-0026878

(51) Int. Cl.
*B60N 2/58* (2006.01)
*B60N 2/56* (2006.01)
*B60N 2/70* (2006.01)

(52) U.S. Cl.
CPC ............. *B60N 2/5657* (2013.01); *B60N 2/70* (2013.01)

(58) Field of Classification Search
CPC .. B60N 2/5635; B60N 2/5657; B60N 2/5628; B60N 2/5621; B60N 2/5642; A47C 7/74; A47C 7/18; A47C 7/744
USPC ....................................................... 297/452.47
See application file for complete search history.

(56) References Cited

U.S. PATENT DOCUMENTS

| | | | | |
|---|---|---|---|---|
| 5,924,766 A | * | 7/1999 | Esaki .................. | B60N 2/5657 297/180.13 |
| 6,786,545 B2 | * | 9/2004 | Bargheer ................. | B60J 7/223 297/217.1 |
| 7,587,901 B2 | * | 9/2009 | Petrovski ............. | B60H 1/2218 62/3.3 |
| 7,640,754 B2 | * | 1/2010 | Wolas .................. | B60N 2/5657 62/3.61 |

(Continued)

FOREIGN PATENT DOCUMENTS

JP 2014-094622 A 5/2014
JP 2018-144517 A 9/2018
(Continued)

*Primary Examiner* — Shin H Kim (74) *Attorney, Agent, or Firm* — Morgan, Lewis & Bockius LLP (57) ABSTRACT

A ventilation device for a slim vehicular seat configured for easily ensuring an airflow path in the slim seat and of reducing a thickness of the slim seat to a desired extent, may include a blowing duct, which extends from a lower portion of a seat cushion, is connected to the lower end portion of a foam pad to greatly reduce the width of the space between the foam pad and a back board, making it possible to easily manufacture a slim seat in which the overall thickness of a seat back is minimized.

15 Claims, 12 Drawing Sheets

(56) References Cited

U.S. PATENT DOCUMENTS

| | | | | |
|---|---|---|---|---|
| 8,601,824 | B2* | 12/2013 | Jun | B60N 2/5657 |
| | | | | 62/3.4 |
| 8,888,573 | B2* | 11/2014 | Bajic | B60N 2/5635 |
| | | | | 454/120 |
| 8,979,620 | B2* | 3/2015 | Efthymiou | B60H 1/00507 |
| | | | | 454/120 |
| 10,160,356 | B2* | 12/2018 | Lofy | B60N 2/565 |
| 10,384,575 | B2* | 8/2019 | Yu | B60N 2/5642 |
| 2007/0241592 | A1* | 10/2007 | Griffin | B60N 2/5635 |
| | | | | 297/180.1 |
| 2012/0261974 | A1* | 10/2012 | Yoshizawa | B60N 2/5642 |
| | | | | 297/452.42 |
| 2013/0113265 | A1* | 5/2013 | Ota | B60N 2/5657 |
| | | | | 297/452.47 |
| 2019/0143859 | A1* | 5/2019 | Sakoda | B60N 2/90 |
| | | | | 297/218.1 |
| 2019/0176663 | A1* | 6/2019 | Hoshi | B60N 2/5642 |

FOREIGN PATENT DOCUMENTS

| | | |
|---|---|---|
| JP | 2018-144518 A | 9/2018 |
| JP | 2019-026098 A | 2/2019 |
| JP | 2019-026255 A | 2/2019 |
| KR | 10-1208756 B1 | 12/2012 |
| WO | WO 2018/042769 A1 | 3/2018 |

* cited by examiner

[ A-A SECTION ]

VENTILATION DEVICE FOR SLIM VEHICULAR SEAT

CROSS-REFERENCE TO RELATED APPLICATION

The present application claims priority to Korean Patent Application No. 10-2020-0026878 filed on Mar. 4, 2020, the entire contents of which is incorporated herein for all purposes by this reference.

BACKGROUND OF THE INVENTION

Field of the Invention

The present invention relates to a ventilation device for a slim vehicular seat. More particularly, it relates to a ventilation device for a slim vehicular seat capable of easily ensuring an airflow path in the slim seat and of reducing the thickness of the slim seat to a desired extent.

Description of Related Art

A vehicular seat includes a seat cushion on which a passenger sits, a seat back, against which the passenger leans, and a headrest for supporting the passenger's neck and head. The vehicular seat is provided therein with a ventilation device configured for ejecting air toward the surface of the seat and with various mechanisms for adjusting the position of the seat.

In a seat for an autonomous vehicle, a swivel mechanism, which is capable not only of moving the seat in an anteroposterior direction but also of rotating the seat for conversation between passengers, may be applied.

Furthermore, to easily ensure the rotational orbit of the seat offered by the swivel mechanism in the confined indoor space in the vehicle, it is preferable to implement a slim seat having minimal thickness.

However, a conventional seat back faces a limitation in the extent to which the thickness thereof is configured for being reduced due to a ventilation device provided in the seat back.

Figure 1:
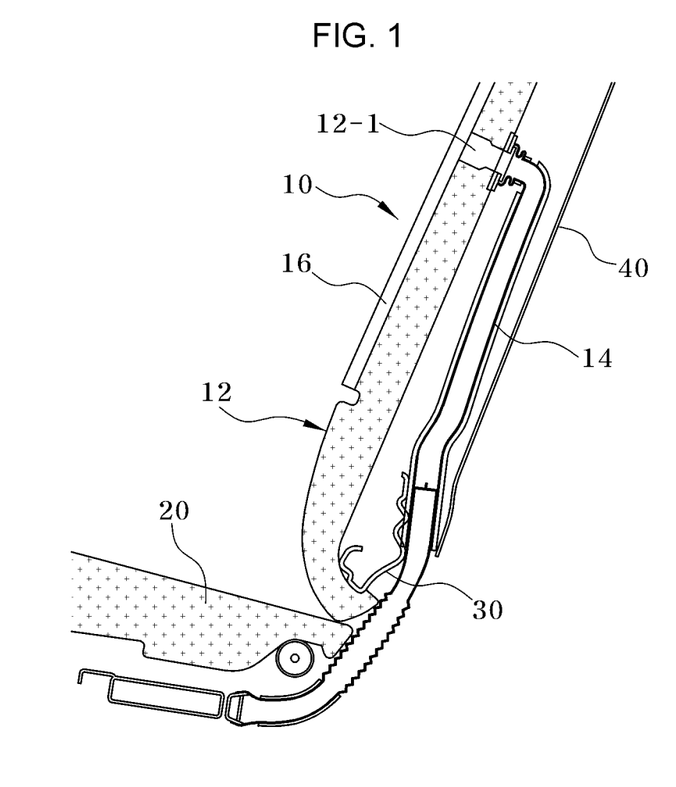
FIG. 1 is a cross-sectional view exemplarily illustrating a conventional seat back, which is provided therein with a ventilation device.

FIG. 1 is a cross-sectional view exemplarily illustrating a conventional seat back 10, which is provided therein with a ventilation device.

The seat back 10 includes a foam pad 12 having a blowing hole 12-1 formed in an upper portion thereof.

An air distribution pad 16 is attached to the front surface of the foam pad 12, and a blowing duct 14 is provided at the rear surface of the foam pad 12 to communicate with the blowing hole 12-1.

The blowing duct 14 extends to the rear surface of the foam pad 12 from a lower portion of the seat cushion 20, and is coupled to the blowing hole 12-1 in the foam pad 12.

The lower end portion of the blowing duct 14, which extends to the rear surface of the foam pad 12, is in close contact with a seat back lower frame 30 and is supported thereby.

For reference, although not shown in the air distribution pad 16, an air distribution path is formed in the air distribution pad 16 to communicate with the foam pad 12.

A back board 40 is mounted on the rear surface of the foam pad 12 to cover the blowing duct 14 in the state of being spaced from the rear surface thereof.

Accordingly, the overall thickness of the seat back 10 is the sum of the thickness of the foam pad 12, the width of the space between the foam pad 12, on which the blowing duct 14 is mounted, and the thickness of the back board 40.

As described above, because the conventional seat back 10 includes the space between the rear surface of the foam pad 12 and the front surface of the back board 40, which is required to accommodate the blowing duct 14, in addition to the thickness of the foam pad 12 and the thickness of the back board 40, the overall thickness of the seat back 10 may be increased, which is an impediment to design and manufacture of a slim seat.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a ventilation device configured for a slim vehicular seat, in which a blowing duct extending from a lower portion of a seat cushion is connected to the lower end portion of a foam pad to greatly reduce the width of the space between the foam pad and a back board, making it possible to easily manufacture a slim seat in which the overall thickness of the seat back is minimized.

Various aspects of the present invention are directed to providing a ventilation device configured for a slim vehicular seat, in which a blowing hole is formed in a lower portion of a foam pad of a seat back, a blowing duct, which extends from a lower portion of a seat cushion, is supported by a seat back lower frame, and an upper end portion of the blowing duct is coupled to the blowing hole in the foam pad in an airtight manner, facilitating a back board to be mounted on a rear surface of the foam pad as close thereto as possible.

In an exemplary embodiment of the present invention, the seat back lower frame may be provided in the front surface thereof with a support groove, in which the blowing duct is fitted and supported.

In another exemplary embodiment of the present invention, the seat back lower frame may be provided with a support hole formed through the seat back lower frame, in which the blowing duct is fitted and supported.

In yet another exemplary embodiment of the present invention, the foam pad may be provided on a front surface thereof with an air distribution path, which extends upwards and fluidically-communicates with the blowing hole.

In yet another exemplary embodiment of the present invention, the foam pad may include a support plate, which is attached to an external peripheral surface of the blowing hole to support the upper end portion of the blowing duct.

In still yet another exemplary embodiment of the present invention, the support plate may include an upper fixing plate and a lower fixing plate, which are mounted on an upper portion and a lower portion of the support plate, respectively to lock and fix the upper end portion of the blowing duct.

In a further exemplary embodiment of the present invention, a lower portion of the upper fixing plate and an upper portion of the lower fixing plate may be respectively provided with locking stepped portions, and a periphery of the upper end portion of the blowing duct may be provided with a locking flange, which is fitted and locked in the locking stepped portions.

In another further exemplary embodiment of the present invention, the blowing duct, which extends from the lower portion of the seat cushion, may include a first blowing duct and a second blowing duct, which extend through the seat back lower frame, are firstly bent toward respective internal spaces in seat back side frames, are secondly bent toward the blowing hole formed in the rear surface of the foam pad, and are coupled to the blowing hole.

In another further exemplary embodiment of the present invention, the first and second blowing ducts, which extend through the seat back lower frame and are firstly bent toward internal spaces in the seat back side frames, may be disposed in spaces behind bolsters of the foam pad.

In yet another further exemplary embodiment of the present invention, the first and second blowing ducts may be coupled to the seat back side frames via support rings.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, the reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the present invention will be described in conjunction with exemplary embodiments thereof, it will be understood that the present description is not intended to limit the present invention to those exemplary embodiments. On the contrary, the present invention is intended to cover not only the exemplary embodiments of the present invention, but also various alternatives, modifications, equivalents and other embodiments, included within the spirit and scope of the present invention as defined by the appended claims.

Hereinafter, exemplary embodiments of the present invention will be described in detail with reference to the accompanying drawings.

Figure 2:
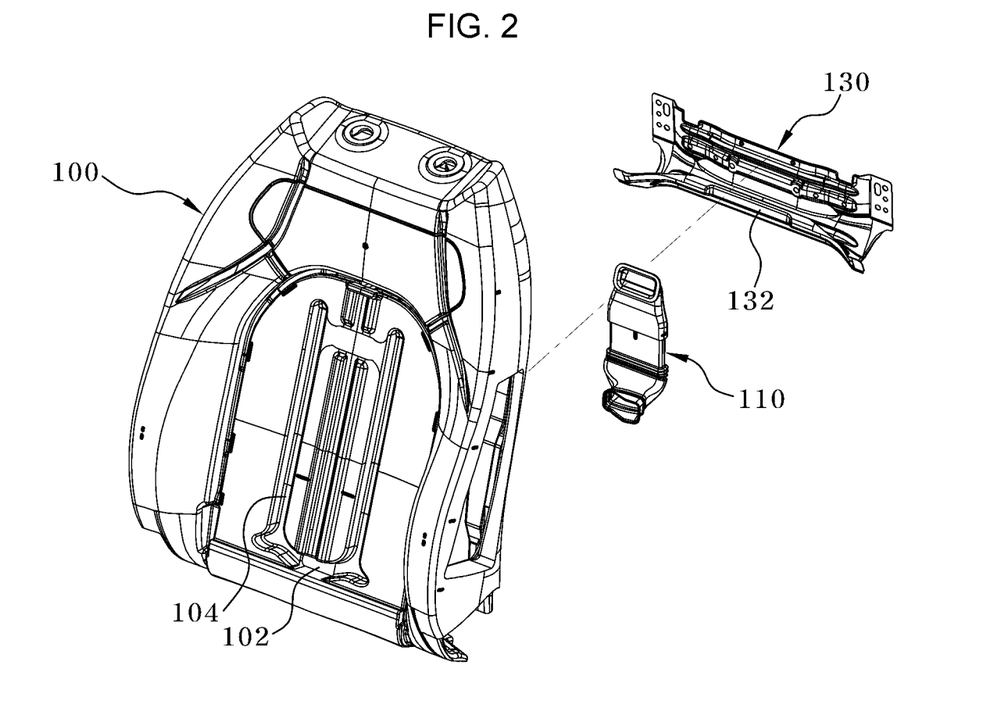
FIG. 2 is an exploded perspective view of a ventilation device configured for a slim vehicular seat according to various exemplary embodiments of the present invention.
Figure 3:
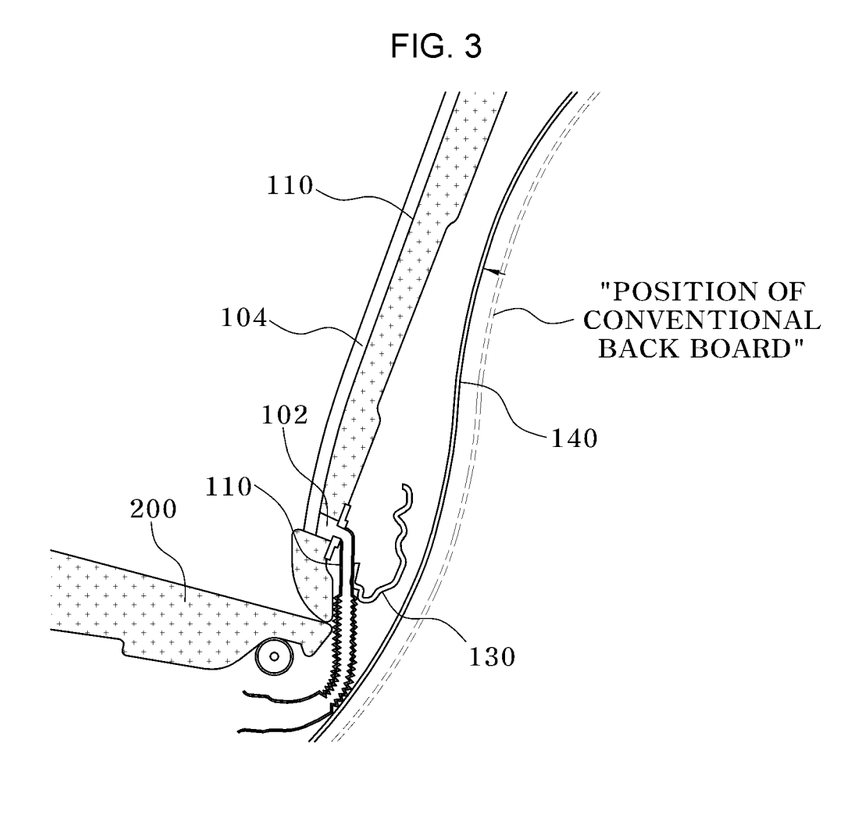
FIG. 3 is a cross-sectional view exemplarily illustrating the ventilation device configured for a slim vehicular seat according to the various exemplary embodiments of the present invention.

In the accompanying drawings, FIG. 2 is an exploded perspective view of a ventilation device configured for a slim vehicular seat according to various exemplary embodiments of the present invention, and FIG. 3 is a cross-sectional view exemplarily illustrating the ventilation device configured for a slim vehicular seat according to the various exemplary embodiments of the present invention. In the drawings, reference numeral "100" indicates a foam pad of a seat back.

The foam pad 100 of the seat back is provided in the lower portion thereof with a blowing hole 102, which is formed through the foam pad 100 to allow air to be discharged therethrough. The foam pad 100 is provided at the front surface thereof with an air distribution path 104, which fluidically-communicates with the blowing hole 102 and extends upwards.

The upper end portion of a blowing duct 110, which extends upwards from the lower portion of a seat cushion 200, is directly and airtightly coupled to the blowing hole in the foam pad 100.

Because the foam pad 100 is made of an elastic material to provide the seat back with a cushioning effect, there may be a difficulty in directly coupling the upper end portion of the blowing duct 110 to the surface of the foam pad 100. Accordingly, the blowing duct 110 is coupled to the external peripheral surface of the blowing hole 102 in the foam pad by a structure including a separate hard material.

Figure 9A:
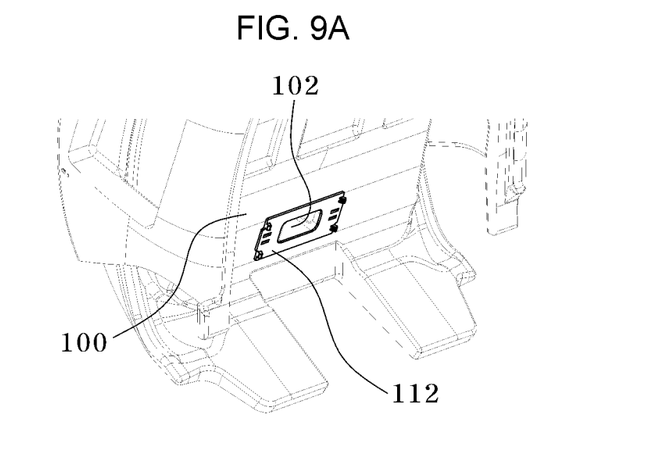
FIG. 9A, FIG. 9B, FIG. 9C, FIG. 9D and FIG. 9E are perspective views illustrating a process of assembling the foam pad with the blowing duct among the components of the ventilation device configured for a slim vehicular seat according to the first or various exemplary embodiments of the present invention.

To this end, a rectangular frame-shaped support plate 112 is first attached to the external peripheral surface of the blowing hole 102 in the foam pad 100 to support the upper end portion of the blowing duct 110, as illustrated in FIG. 9A.

Figure 9B:
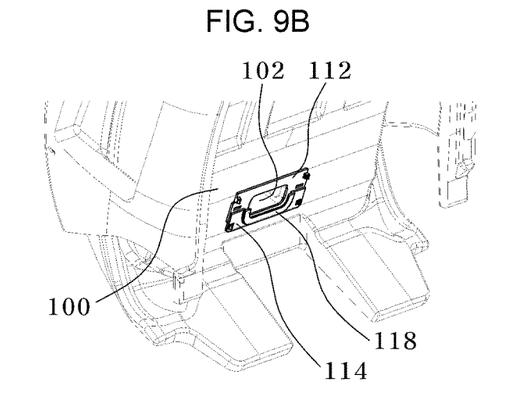

Subsequently, a lower fixing plate 114 is mounted on the lower portion of the support plate 112 via screws or the like, as illustrated in FIG. 9B. Here, the fixing plate 114 is provided at the upper end portion thereof with a locking stepped portion 118 such that the lower fixing plate 114 defines a groove, which is concave downwards, in cooperation with the support plate 112.

Figure 9C:
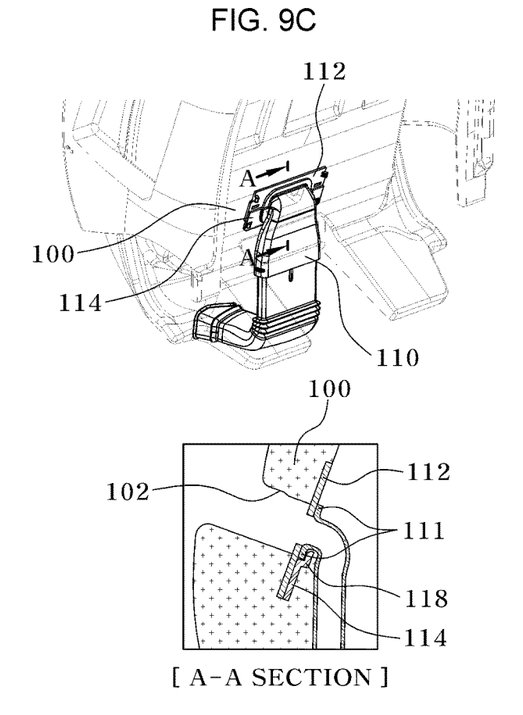

Thereafter, a locking flange 111 of the blowing duct 110, which is bent outwards at the upper end portion of the blowing duct 110, is fitted into the locking stepped portion 118 of the lower fixing plate 114 and is coupled thereto, as illustrated in FIG. 9C.

Figure 9D:
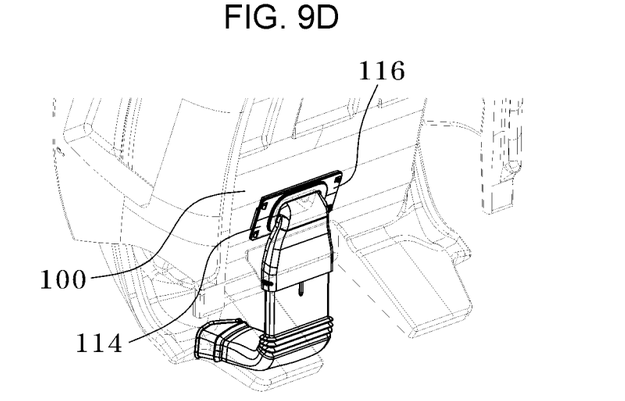

Subsequently, an upper fixing plate 116 is mounted on the support plate 112 via screws or the like. Here, the upper fixing plate 116 is also provided at the lower end portion thereof with a locking stepped portion 118 such that the upper fixing plate 116 defines a groove which is concave upwards together with the support plate 112.

When the upper fixing plate 116 is mounted on the support plate 112, the locking flange 111 of the upper end portion of the blowing duct 110, which is bent outwards, is covered by the upper fixing plate 116, as illustrated in FIG. 9D. As a result, the locking flange 11 of the blowing duct 110 is fitted in the locking stepped portion 118 in the upper fixing plate 116 and is coupled thereto.

Consequently, the upper end portion of the blowing duct 110 is fixedly secured to the foam pad while communicating with the blowing hole 102 in the foam pad 100 by the support plate 112, the lower fixing plate 114 and the upper fixing plate 116.

Figure 9E:
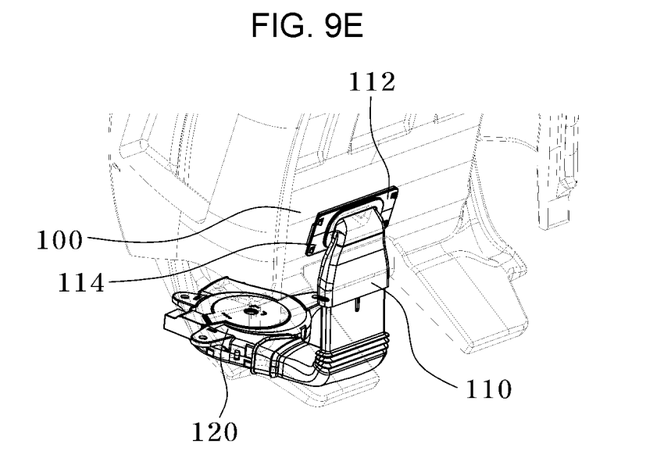

After the blowing duct 110 has been coupled to the blowing hole 102 in the foam pad 100, an air blower 120, which is a drive unit of supplying air, is coupled to the lower end portion of the blowing duct 110, as illustrated in FIG. 9E.

To support and secure the blowing duct 110, a seat back lower frame 130, which is positioned at the lower side of the foam pad 100, is provided at a predetermined location in the front surface thereof with a support groove 132, in which the blowing duct 110 is fitted and supported.

Accordingly, since the lower portion of the upper end portion of the blowing duct 110 is fitted in and secured to the support groove 132 in the seat back lower frame 130, it is possible to prevent trembling of the blowing duct 110 caused by vibration of a vehicle body or the like.

As a result, cool air, which is blown by the operation of the air blower 120, is distributed to the air distribution path 104 formed in the front surface of the foam pad 100 via the blowing duct 110 and the blowing hole 102 in the foam pad 100, and is then discharged toward a passenger sitting on the seat, whereby it is possible to easily supply cool air to the passenger in summer months.

In other words, since the upper end portion of the blowing duct 110 is coupled to the blowing hole 102 formed in the lower end portion of the foam pad 100 to communicate therewith through an opening of the support plate 112, the lower fixing plate 114 and the upper fixing plate 116, it is possible to mount a back board 140 to the rear surface of the foam pad 100 of the seat back as close thereto as possible, and thus it is possible to easily manufacture a slim seat in which the overall thickness of the seat back is minimized.

Because the blowing duct 14 is located between the foam pad 12 and the back board 40 in the related art, as illustrated in FIG. 1, the overall thickness of the seat back is inevitably increased. In contrast, since the present invention is constructed such that the blowing duct 110 is coupled to the blowing hole 102 formed in the lower portion of the foam pad 100 and thus the blowing duct is not present between the foam pad 100 and the back board 140 of the seat back, it is possible to mount the back board 140 on the rear surface of the foam pad 100 as close thereto as possible, and thus it is possible to provide a slim seat in which the overall thickness of the seat back is minimized, as illustrated in FIG. 3.

Figure 4:
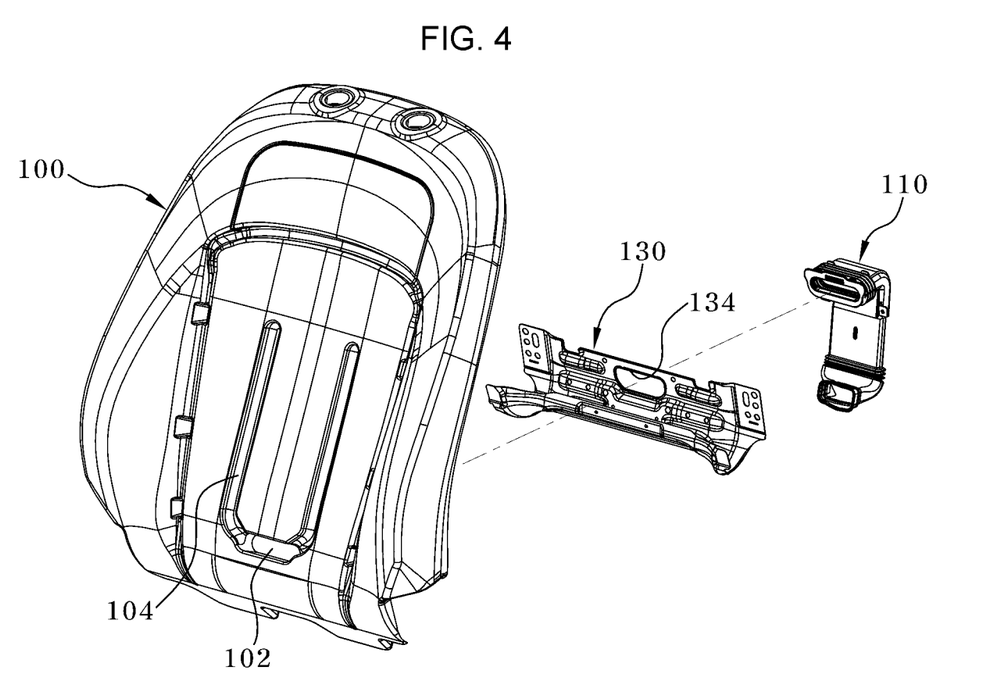
FIG. 4 is an exploded perspective view of a ventilation device configured for a slim vehicular seat according to various exemplary embodiments of the present invention.
Figure 5:
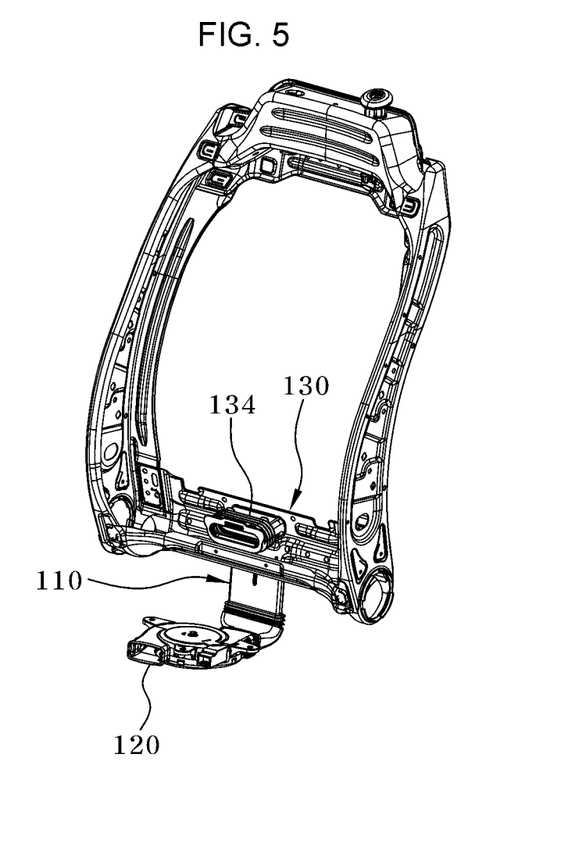
FIG. 5 is a perspective of the ventilation device configured for a slim vehicular seat according to the various exemplary embodiments of the present invention, in which the blowing duct and the seat back lower frame are assembled with each other.
Figure 6:
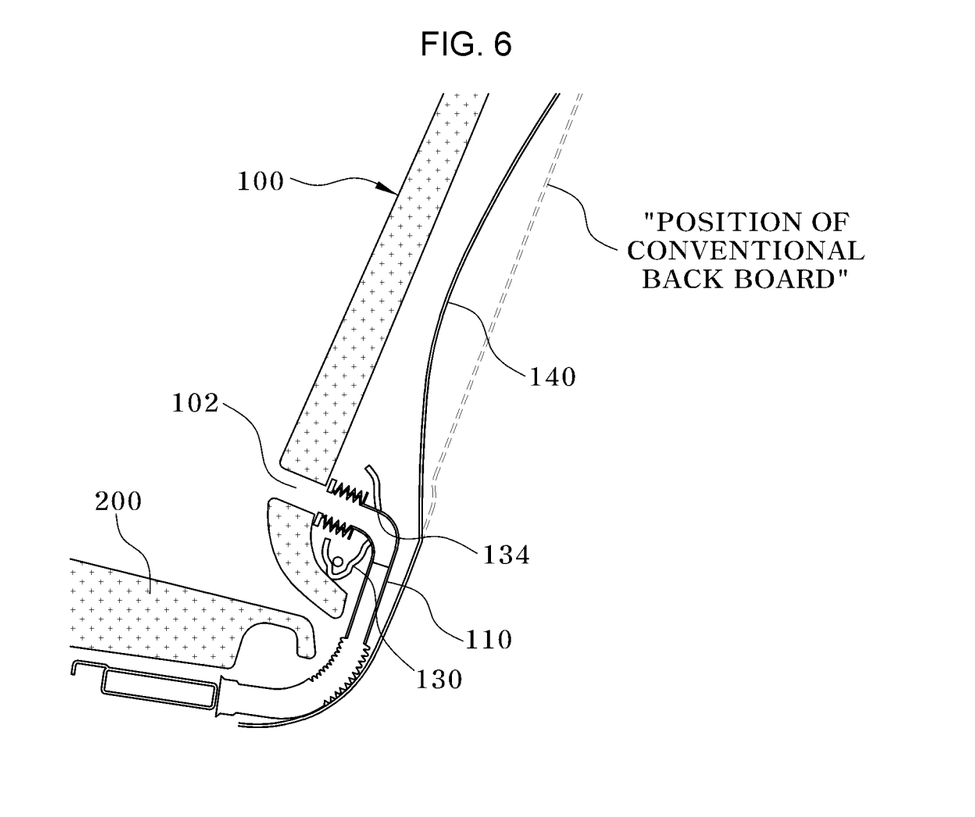
FIG. 6 and FIG. 7 are cross-sectional views illustrating the ventilation device configured for a slim vehicular seat according to the various exemplary embodiments of the present invention.
Figure 7:
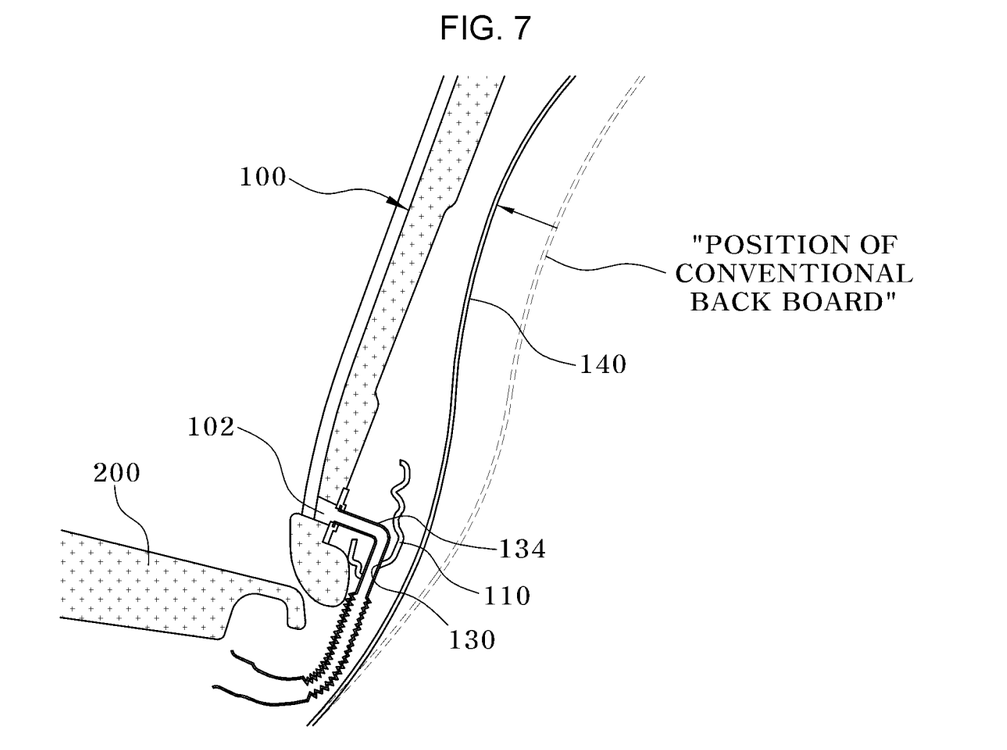

Among the accompanying drawings, FIG. 4 is an exploded perspective view of a ventilation device configured for a slim vehicular seat according to various exemplary embodiments of the present invention. FIG. 5 is a perspective of the ventilation device configured for a slim vehicular seat according to the various exemplary embodiments of the present invention, in which the blowing duct and the seat back lower frame are assembled with each other. FIG. 6 and FIG. 7 are cross-sectional views illustrating the ventilation device configured for a slim vehicular seat according to the various exemplary embodiments of the present invention.

Although the various exemplary embodiments of the present invention in FIG. 2 is substantially identical to the various exemplary embodiments of the present invention in FIG. 4, the various exemplary embodiments in FIG. 4 is different from the various exemplary embodiments in FIG. 1 with regard to structure whereby the blowing duct 110 is fitted in and coupled to the seat back lower frame 130.

To this end, a support hole 134 is formed through the seat back lower frame 130 to allow the blowing duct 110 to be fitted therein to and supported accordingly, as illustrated in FIG. 4 and FIG. 5.

To support and secure the blowing duct 110, the support hole 134, into which the blowing duct 110 is fitted, is formed through a predetermined location in the front surface of the seat back lower frame 130 positioned at a lower side of the foam pad 100.

Therefore, since the lower portion of the upper end portion of the blowing duct 110 is fitted into and secured to the support hole 134 in the seat back lower frame 130, it is possible to prevent trembling of the blowing duct 110 caused by vibration of a vehicle body.

As in the various exemplary embodiments of the present invention, which has been described with reference to FIGS. 9A to 9E, the upper end portion of the blowing duct 110 is coupled to the blowing hole 102 formed in the lower end portion of the foam pad 100 to communicate therewith by the support plate 112, the lower fixing plate 114 and the upper fixing plate 116. Consequently, it is possible to mount the back board 140 on the rear surface of the foam pad 110 as close thereto as possible, and thus it is possible to easily manufacture a slim seat in which the overall thickness of the seat back is minimized, as illustrated in FIG. 6.

Meanwhile, the support hole 130, into which the blowing duct 110 is fitted, may be formed through the upper portion of the seat back lower frame 130, as illustrated in FIG. 6, or may be formed through the lower portion of the seat back lower frame 130, as illustrated in FIG. 7, depending on the design specification of the seat back lower frame 130.

Figure 8:
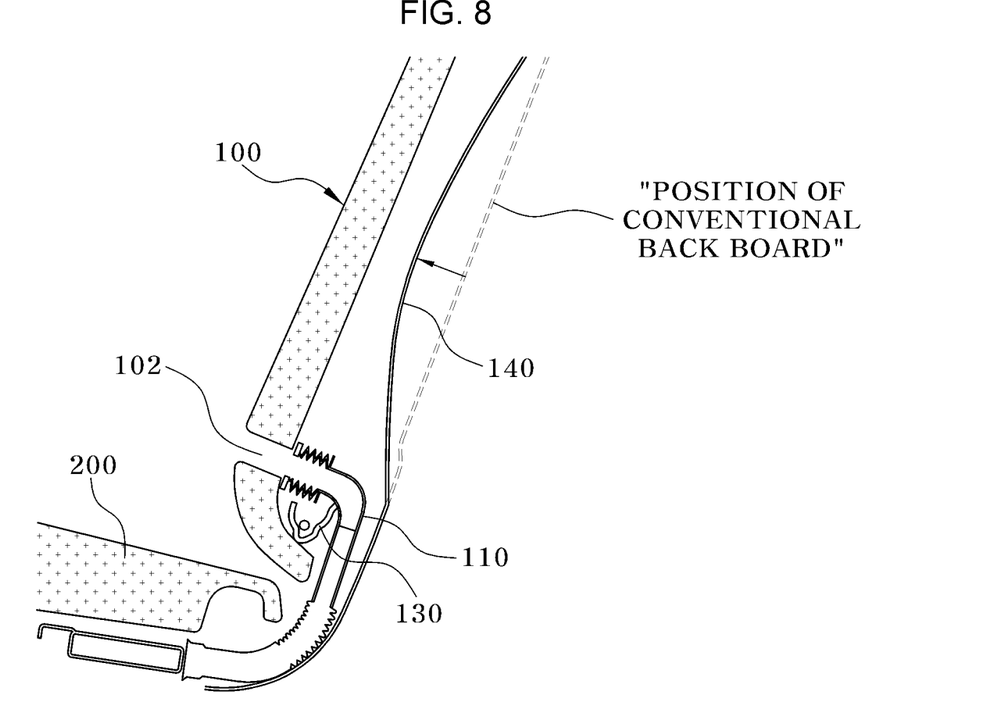
FIG. 8 is a cross-sectional view of a ventilation device configured for a slim vehicular seat according to various exemplary embodiments of the present invention.

FIG. 8 is a cross-sectional view of a ventilation device configured for a slim vehicular seat according to various exemplary embodiments of the present invention.

Although the various exemplary embodiments of the present invention in FIG. 8 is substantially identical to the various exemplary embodiments of the present invention in FIG. 4, the various exemplary embodiments in FIG. 8 is different from the various exemplary embodiments in FIG. 4 with regard to the structure whereby the blowing duct 110 is placed on and supported by the upper end portion of the seat back lower frame 130.

As the seat back lower frame 130, which is directed to support the blowing duct 110, a seat back lower frame 130 having a low height may be applied depending on the design and manufacturing specifications, as illustrated in FIG. 8.

When the height of the seat back lower frame 130 is reduced as in the exemplary embodiment of the present invention, it acts as an impediment to forming the support groove or the support hole for supporting the blowing duct 110. Accordingly, the upper end portion of the blowing duct 110 is supported by the upper end portion of the lower frame 130 in the state of being in closed contact therewith, as illustrated in FIG. 8.

As in the various exemplary embodiments of the present invention in FIG. 2, which has been described with reference to FIGS. 9A to 9E, the upper end portion of the blowing duct 110 is coupled to the blowing hole 102 formed in the lower end portion of the foam pad 100 to communicate therewith by the support plate 112, the lower fixing plate 114 and the upper fixing plate 116. Consequently, it is possible to mount the back board 140 on the rear surface of the foam pad 110 as close thereto as possible, and thus it is possible to easily manufacture the slim seat in which the overall thickness of the seat back is minimized, as illustrated in FIG. 8.

Figure 10:
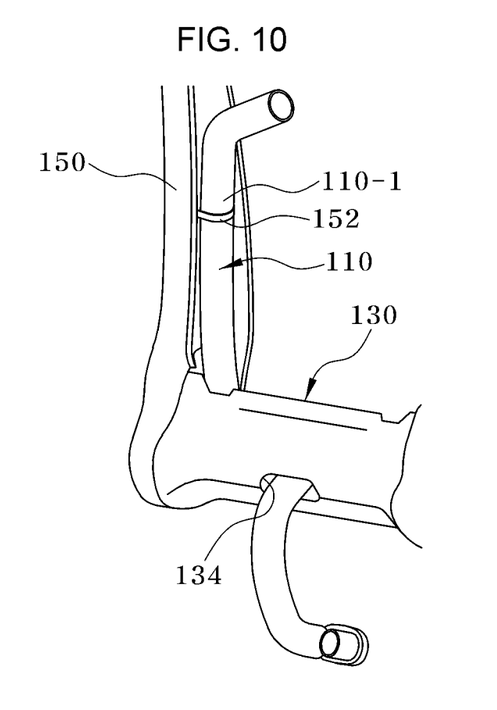
FIG. 10 is a perspective view exemplarily illustrating a ventilation device configured for a slim vehicular seat according to various exemplary embodiments of the present invention.
Figure 11:
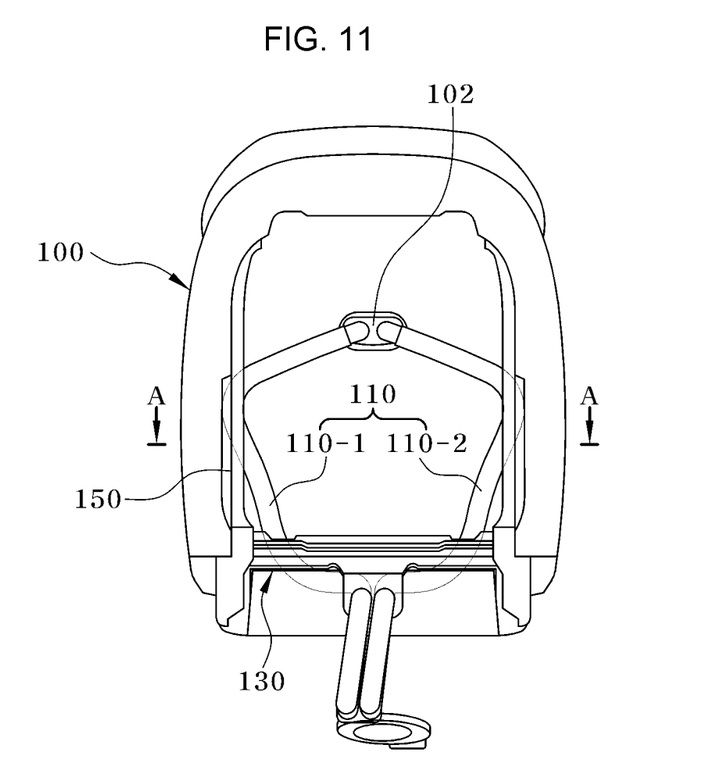
FIG. 11 is a rear view exemplarily illustrating the ventilation device configured for a slim vehicular seat according to the various exemplary embodiments of the present invention.
Figure 12:
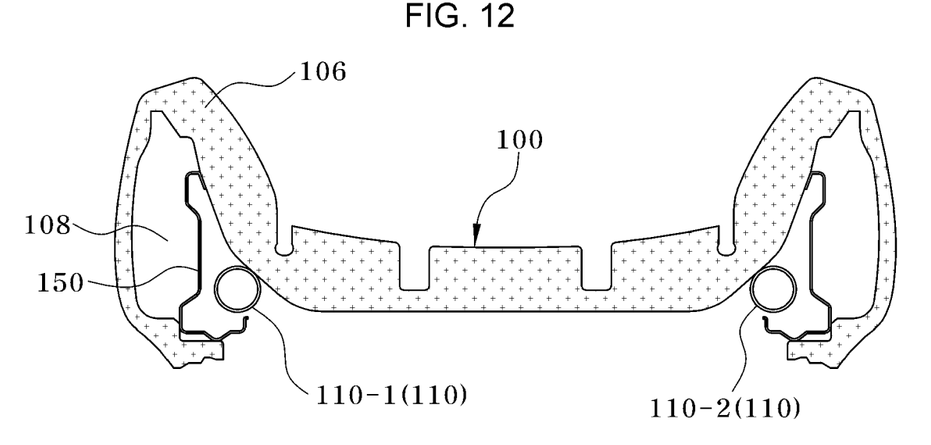
FIG. 12 is a cross-sectional view exemplarily illustrating the ventilation device configured for a slim vehicular seat according to the various exemplary embodiments of the present invention, taken along line A-A in FIG. 11.

FIG. 10 is a perspective view exemplarily illustrating a ventilation device configured for a slim vehicular seat according to various exemplary embodiments of the present invention. FIG. 11 is a rear view exemplarily illustrating the ventilation device configured for a slim vehicular seat according to the various exemplary embodiments of the present invention. FIG. 12 is a cross-sectional view taken along line A-A in FIG. 11.

The various exemplary embodiments of the present invention in FIG. 10 is characterized in that the blowing duct 110 includes a first blowing duct 110-1 and a second blowing duct 110-2.

As illustrated in FIG. 10, and FIG. 11, the first blowing duct 110-1 and the second blowing duct 110-2 extend through the support hole 134, formed in the seat back lower frame 130, from the lower portion of the seat cushion (the portion of the seat cushion which is connected to the air blower), and are firstly bent into the internal space of a seat back side frame 150. Subsequently, the first blowing duct 110-1 and the second blowing duct 110-2 extend further upwards and are secondly bent toward the blowing hole 102 formed in the center portion of the upper end portion of the foam pad 100.

Both the first blowing duct 110-1 and the second blowing duct 110-2 are airtightly coupled to the single blowing hole 102 formed in the center portion of the upper end portion of the foam pad 100.

The first blowing duct 110-1 and the second blowing duct 110-2 are coupled to the seat back side frame 150 via support rings 152. Consequently, it is possible to prevent trembling of the blowing ducts 110-1 and 110-2 caused by vibration of the vehicle body.

The first blowing duct 110-1 and the second blowing duct 110-2, which extend through the seat back lower frame 130 and are firstly bent toward the internal space in the seat back side frame 150, do not project from the rear surface of the foam pad 100 but are disposed in the space 108 behind the bolster 106 of the foam pad 100, as illustrated in FIG. 12.

The foam pad 100 is provided at both sides thereof with the bolsters 106, which project forwards and surround and support the lateral sides of a passenger's torso. The spaces behind the bolsters 106 define the bolster-rear spaces 108. The first blowing duct 110-1 and the second blowing duct 110-2 are disposed in the bolster-rear spaces 108 in the foam pad 100, and thus the first blowing duct 110-1 and the second blowing duct 110-2 do not project from the rear surface of the foam pad 100.

Consequently, since the first blowing duct 110-1 and the second blowing duct 110-2 are disposed in the bolster-rear spaces 108 in the foam pad 100, it is possible to mount the back board on the rear surface of the foam pad 100 of the seat back as close thereto as possible, and it is possible to easily manufacture a slim seat in which the overall thickness of the seat back is minimized.

As is apparent from the above description, according to the exemplary embodiment of the present invention, the blowing duct, which extends from the lower portion of the seat cushion, is connected to the lower end portion of the foam pad of the seat back. Accordingly, since the conventional structure in which the blowing duct is disposed in the space between the foam pad and the back board is obviated, it is possible to greatly reduce the overall thickness of the seat back. As a result, it is possible to easily manufacture a slim seat in which the overall thickness of the seat back is minimized, and it is possible to easily ensure the rotational orbit of a swivel seat in the confined space in a vehicle.

By the above-described constructions, the present invention offers the following effects.

First, since the conventional structure in which a blowing duct is disposed in the space between a foam pad and a back board is obviated by connecting the blowing duct, which extends from a lower portion of a seat cushion, to the lower end portion of the foam pad, it is possible to greatly reduce the overall thickness of the seat back, and thus it is possible to easily manufacture a slim seat in which the overall thickness of the seat back is minimized.

Second, since a slim seat in which the overall thickness of the seat back is minimized is easily manufactured, it is possible to easily ensure the rotational orbit of a swivel seat in the confined indoor space in a vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A ventilation device for a vehicular seat,
wherein a blowing hole is formed in a lower portion of a foam pad of a seat back,
wherein a blowing duct, which extends from a lower portion of a seat cushion, is supported by a seat back lower frame,
wherein an upper end portion of the blowing duct is airtightly coupled to the blowing hole in the foam pad, thereby facilitating a back board to be mounted on a rear surface of the foam pad as close thereto as possible, and
wherein the seat back lower frame is provided in a front surface of the seat back lower frame with a support groove, in which the blowing duct is fitted and supported.

2. The ventilation device of claim 1,
wherein the seat back lower frame is provided with a support hole formed through the seat back lower frame, and
wherein the blowing duct is fitted in and supported by the support hole.

3. The ventilation device of claim 1,
wherein the foam pad is provided with an air distribution path in a front surface of the foam pad, and
wherein the air distribution path is formed to extend upwards and fluidically-communicate with the blowing hole.

4. The ventilation device of claim 1, further including a support plate mounted on the foam pad,
wherein the support plate is attached to an external peripheral surface of the blowing hole to support the upper end portion of the blowing duct.

5. The ventilation device of claim 4,
wherein the support plate includes an opening, and
wherein the upper end portion of the blowing duct is engaged to the opening of the support plate.

6. The ventilation device of claim 4, further including an upper fixing plate mounted on an upper portion of the support plate to lock and fix the upper end portion of the blowing duct.

7. The ventilation device of claim 6,
wherein a lower portion of the upper fixing plate is provided with a locking stepped portion, and
wherein a periphery of the upper end portion of the blowing duct is provided with a locking flange, which is fitted and locked in the locking stepped portion.

8. The ventilation device of claim 4, further including a lower fixing plate mounted on a lower portion of the support plate to lock and fix the upper end portion of the blowing duct.

9. The ventilation device of claim 8,
wherein an upper portion of the lower fixing plate is provided with a locking stepped portion, and
wherein a periphery of the upper end portion of the blowing duct is provided with a locking flange, which is fitted and locked in the locking stepped portion.

10. The ventilation device of claim 4, further including an upper fixing plate and a lower fixing plate, which are mounted on an upper portion and a lower portion of the support plate, respectively to lock and fix the upper end portion of the blowing duct.

11. The ventilation device of claim 10,
wherein a lower portion of the upper fixing plate is provided with a first locking stepped portion and an upper portion of the lower fixing plate is provided with a second locking stepped portion, and
wherein a periphery of the upper end portion of the blowing duct is provided with a locking flange, which is fitted and locked in the first and second locking stepped portions.

12. The ventilation device of claim 1, wherein the blowing duct, which extends from the lower portion of the seat cushion, includes a first blowing duct and a second blowing duct, which extend through the seat back lower frame, are firstly bent toward respective internal spaces in seat back side frames, are secondly bent toward the blowing hole formed in the rear surface of the foam pad, and are coupled to the blowing hole.

13. The ventilation device of claim 12, wherein the first and second blowing ducts, which extend through the seat back lower frame and are firstly bent toward internal spaces in the seat back side frames, are mounted in spaces behind bolsters of the foam pad.

14. The ventilation device of claim 12, wherein the first and second blowing ducts are coupled to the seat back side frames via support rings.

15. A ventilation device for a vehicular seat,
wherein a blowing hole is formed in a lower portion of a foam pad of a seat back,
wherein a blowing duct, which extends from a lower portion of a seat cushion, is supported by a seat back lower frame, and
wherein an upper end portion of the blowing duct is airtightly coupled to the blowing hole in the foam pad, thereby facilitating a back board to be mounted on a rear surface of the foam pad as close thereto as possible, and
wherein the foam pad is provided with an air distribution path in a front surface of the foam pad, and
wherein the air distribution path is formed to extend upwards and fluidically-communicate with the blowing hole.

* * * * *